Dec. 14, 1926.  
G. FORNACA  
1,610,764
DEVICE FOR PREVENTING ABNORMAL FLEXURE OF VEHICLE SPRINGS
Filed March 5, 1925  4 Sheets-Sheet 1
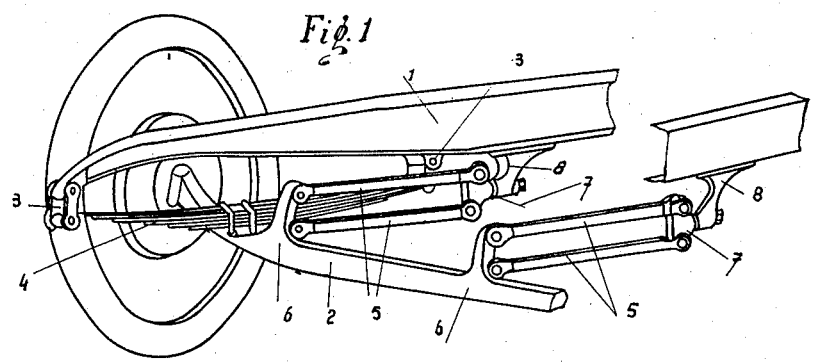
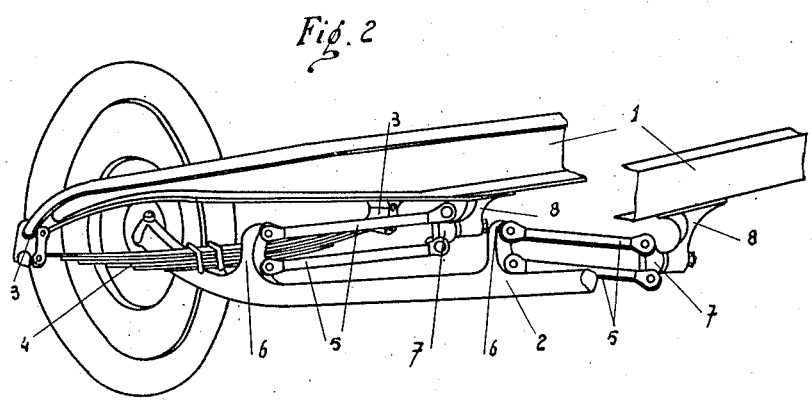
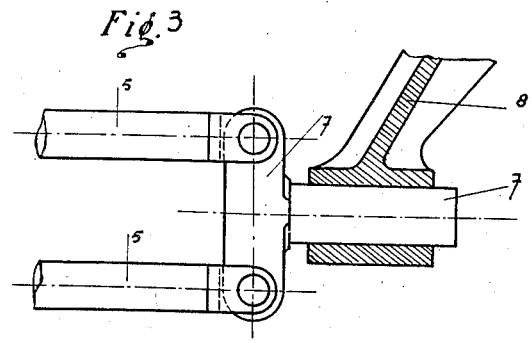
Inventor  
Guido Fornaca  
By Kenworth Jr  atty.

Dec. 14, 1926.
G. FORNACA
1,610,764
DEVICE FOR PREVENTING ABNORMAL FLEXURE OF VEHICLE SPRINGS
Filed March 5, 1925    4 Sheets-Sheet 2

Inventor
Guido Fornaca
By *[signature]* atty.

Dec. 14, 1926.   G. FORNACA   1,610,764

DEVICE FOR PREVENTING ABNORMAL FLEXURE OF VEHICLE SPRINGS

Filed March 5, 1925     4 Sheets-Sheet 3

Dec. 14, 1926.  1,610,764
G. FORNACA
DEVICE FOR PREVENTING ABNORMAL FLEXURE OF VEHICLE SPRINGS
Filed March 5, 1925    4 Sheets-Sheet 4
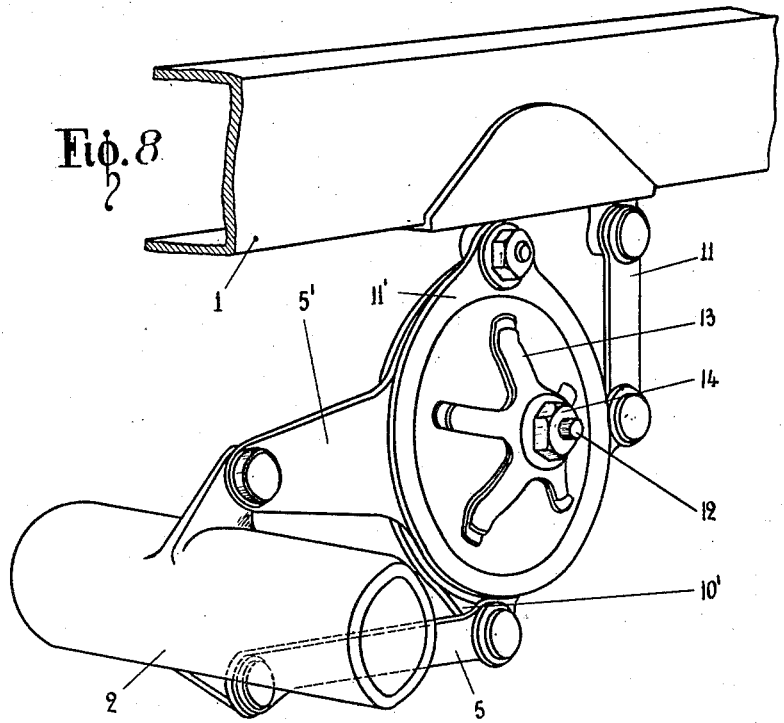
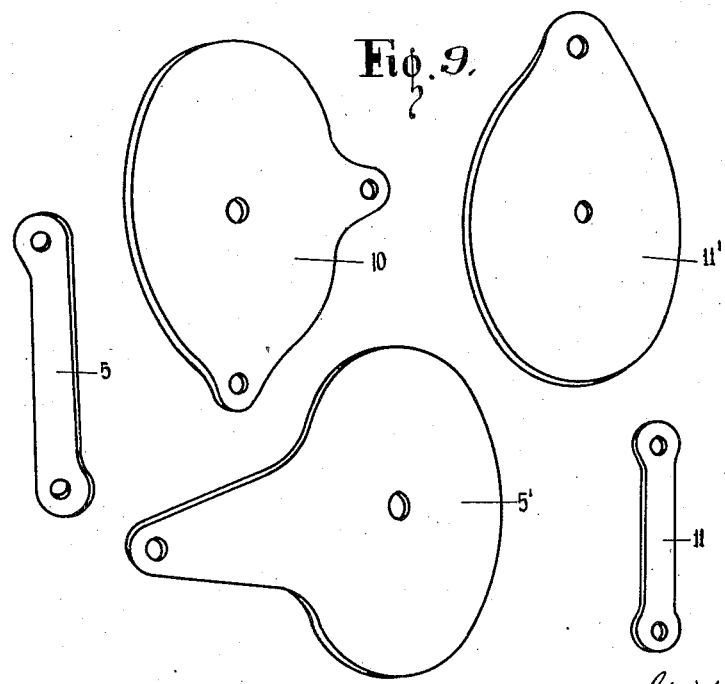

Patented Dec. 14, 1926.

1,610,764

UNITED STATES PATENT OFFICE.

GUIDO FORNACA, OF TURIN, ITALY.

DEVICE FOR PREVENTING ABNORMAL FLEXURE OF VEHICLE SPRINGS.

Application filed March 5, 1925, Serial No. 13,228, and in Italy March 13, 1924.

It is well known that in vehicles provided with brakes on the front wheels the springs are liable to undergo abnormal deformations when the brakes are applied.

For this reason it has been proposed to provide means which prevent any movement of twist of the axle and consequently any abnormal flexure of the springs without hindering the normal operation of the springs. Said means comprise systems of parallel links or levers connecting the axle with the chassis in such manner as to allow the axle full freedom of movement while maintaining it always parallel to itself and to the chassis; but these known systems cannot be fitted to vehicles in which one end of each front spring is directly connected to the chassis without the interposition of shackles.

In accordance with the present invention this disadvantage is overcome by so connecting the parallel links or levers with the vehicle frame that they can move parallel or substantially parallel to the longitudinal axis of the vehicle.

In one construction the links are pivoted to a T-piece having a journal rotatably mounted and movable axially in a support connected to the frame.

In another construction the links are pivoted to a bell crank which is suspended from the frame by means of two additional links constituting a second system of articulated links.

If desired the surfaces of some of the links and of the bell crank lever may be extended to form discs adapted to slide relatively to one another with each movement of the axle, said discs being constrained towards one another by springs. With this construction, the system will also act as a shock absorber.

Embodiments of the invention are illustrated, by way of example, on the accompanying drawings, wherein:—

Figs. 1 and 2 are perspective views showing one form suitable for use with springs connected with the vehicle chassis by links at both ends of the springs;

Fig. 3 shows a modification suitable for use with springs connected with the chassis in the usual way by links at the rear ends only;

Fig. 8 is an enlarged detail perspective view of the form shown in Figs. 6 and 7.

Figs. 9 shows in detail some of the parts of the form illustrated by Fig. 8.

Figure 4:
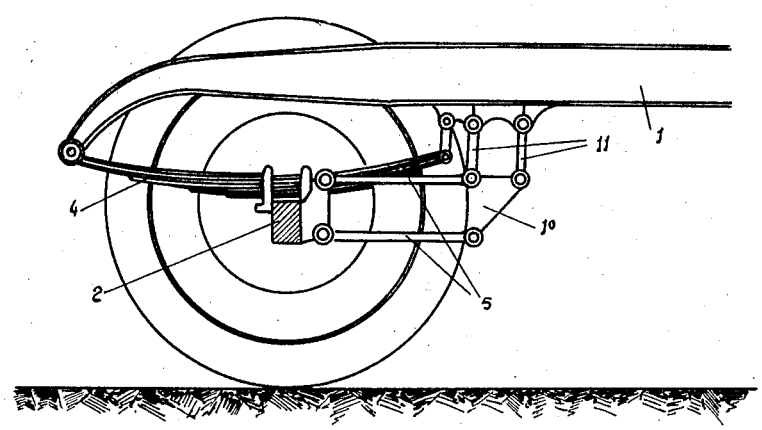
Figs. 4 and 5 are sectional elevations showing another form.

In Figs. 1 and 2, the reference 1 indicates the motor chassis to which the axle 2 is connected by means of the springs 4 attached at both ends to the chassis by links or shackles 3.

Two pairs of parallel links 5 are jointed, at 6, to the axle 2, and also to T pieces 7 which are turnably mounted in supports 8 fixed to the chassis 1.

It is clear that the arrangement allows the axle to undergo free displacement in the vertical plane and to be inclined in that plane but restrains it against movement in all other directions, so that it cannot turn or twist when the brakes are applied.

For the successful operation of the form just described it is essential that the springs be connected with the chassis by links 3 as shown.

For the usual arrangement in which each spring is connected only at the rear end by links and is attached directly to the chassis at the front, the journal 7' of the T piece is left free to move axially as well as rotate in its support 8, thus allowing for the small horizontal and longitudinal displacements of the axle due to the flexure of the spring.

Figure 5:
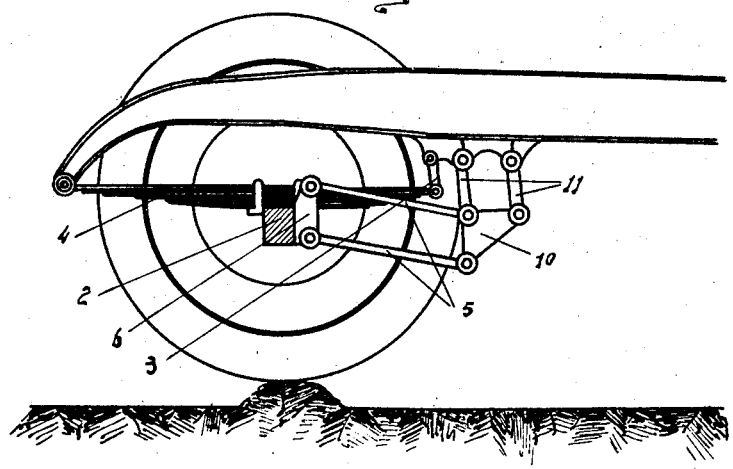

Similar results may be obtained by the arrangement shown in Figs. 4 and 5, in which the parallel links 5, instead of being jointed to a T piece, are jointed to a triangular member or bell crank 10, suspended from the chassis by means of a second set of parallel links 11. Normally the links 11 are approximately at right angles to the links 5.

With this arrangement the springs are free to fulfill their normal function because they are permitted vertical displacement by the movements of the links 5 and horizontal displacement by the links 11. On the other hand, the connections positively prevent any movement of twist or rotation of the axle.

Figure 6:
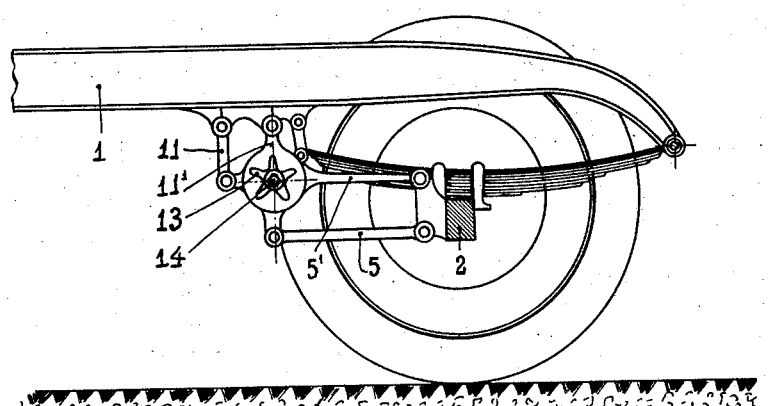
Figs. 6 and 7 are sectional elevations of another form of the device which acts as a shock absorber.
Figure 7:
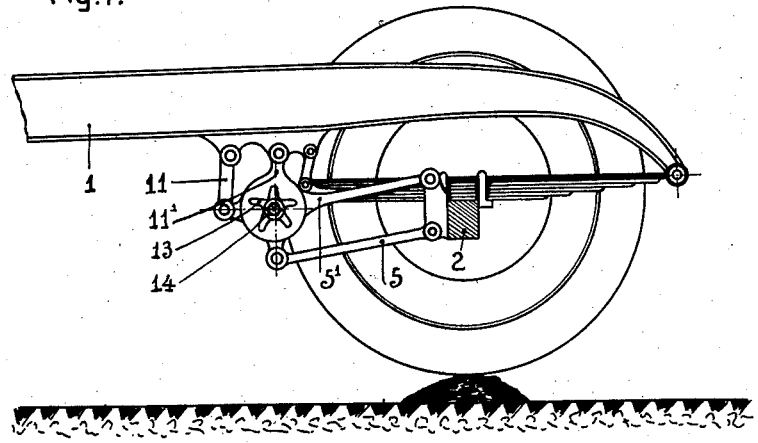

In the form illustrated by Figs. 6 and 7, the upper link 5' and the front link 11' are made similar to the elements of an ordinary shock absorber (see Fig. 7), and the bell crank 10 also serves as a friction disc, these parts being constrained together by springs 13 the pressure exerted by which can be adjusted by means of a nut 14 on the pivot 12.

The lower link 5 and the rear link 11 are substantially the same as described with reference to Figs. 4 and 5.

With this construction each movement of the axle will produce a relative sliding movement of the parts 5′, 10′, 11′ and by interposing packing between one and the other, the oscillations of the spring 4 can be deadened.

What I claim is:

1. The combination with a motor vehicle chassis, of a spring extending longitudinally of the chassis and directly connected to the front end thereof, a link connecting the rear end of the spring to the chassis, an axle connected to the spring in fixed relation thereto, parallel links pivotally connected to the front axle, and means connecting the rear end of the parallel links to the chassis adapted to permit said links to move longitudinally of and substantially parallel to the longitudinal axis of the vehicle.

2. The combination with a motor vehicle chassis, of a spring extending longitudinally of the chassis and directly connected to the front end thereof, a link connecting the rear end of the spring to the chassis, an axle connected to the spring in fixed relation thereto, parallel links pivotally connected to the front axle, a bell-crank connected to the parallel links, and means connecting the bell-crank to the chassis adapted to permit the parallel links to move longitudinally of and substantially parallel to the longitudinal axis of the vehicle.

3. The combination with a motor vehicle chassis, of a spring extending longitudinally of the chassis and directly connected to the front end thereof, a link connecting the rear end of the spring to the chassis, an axle connected to the spring in fixed relation thereto, parallel links pivotally connected to the front axle, a bell-crank connected to the parallel links, and links pivotally connected to the bell-crank and to the chassis whereby said parallel links are movable longitudinally of and substantially parallel to the longitudinal axis of the vehicle.

4. The combination with a motor vehicle chassis, of a spring extending longitudinally of the chassis and directly connected to the front end thereof, a link connecting the rear end of the spring to the chassis, an axle connected to the spring in fixed relation thereto, parallel links pivotally connected to the front axle, one of said links having a circular contact surface thereon, means pivotally connecting the last named link to the chassis, a bell-crank having a circular contact surface thereon, a link connecting the bell-crank to the axle, means to maintain said surfaces in contact, and means pivotally connecting said bell-crank to the chassis.

5. The combination with a motor vehicle chassis, of a spring extending longitudinally of the chassis and directly connected to the front end thereof, a link connecting the rear end of the spring to the chassis, an axle connected to the spring in fixed relation thereto, parallel links pivotally connected to the front axle, one of said links having a circular contact surface thereon, a disk-shaped member connecting the last named link to the chassis, bell-crank having a circular contact surface thereon, a link pivotally connecting the bell-crank to the axle, a link pivotally connecting the bell-crank to the chassis, and means including the disk-shaped member for maintaining the contact surfaces in frictional engagement.

In testimony that I claim the foregoing as my invention, I have signed my name.

GUIDO FORNACA.